(12) United States Patent
Haas et al.

(10) Patent No.: US 9,827,941 B2
(45) Date of Patent: Nov. 28, 2017

(54) AIRBAG MODULE WITH A CONTROL DEVICE

(71) Applicant: Autoliv Development AB, Vårgårda (SE)

(72) Inventors: Martin Haas, Altomünster (DE); Klaus Massanetz, Wartenberg (DE); Thomas Reiter, Vierkirchen (DE); Andreas Guggengerger, München (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/110,219

(22) PCT Filed: Jan. 12, 2015

(86) PCT No.: PCT/EP2015/050375
§ 371 (c)(1),
(2) Date: Jul. 7, 2016

(87) PCT Pub. No.: WO2015/107010
PCT Pub. Date: Jul. 23, 2015

(65) Prior Publication Data
US 2016/0325706 A1     Nov. 10, 2016

(51) Int. Cl.
*B60R 21/239* (2006.01)
*B60R 21/2342* (2011.01)
(Continued)

(52) U.S. Cl.
CPC ........ *B60R 21/239* (2013.01); *B60R 21/2338* (2013.01); *B60R 21/2342* (2013.01);
(Continued)

(58) Field of Classification Search
CPC ... B60R 21/263; B60R 21/233; B60R 21/239; B60R 2021/26058; B60R 2021/23107;
(Continued)

(56) References Cited

U.S. PATENT DOCUMENTS 6,616,184 B2    9/2003   Fischer
6,648,371 B2    11/2003  Vendely et al.
(Continued)

FOREIGN PATENT DOCUMENTS

DE    10 2005 039 418 A1    3/2007
DE    10 2006 051 552 A1    5/2008
(Continued)

OTHER PUBLICATIONS

PCT International Search Report—dated May 18, 2015.

*Primary Examiner* — Paul N Dickson
*Assistant Examiner* — Timothy Wilhelm
(74) *Attorney, Agent, or Firm* — Brinks Gilson & Lione

(57) ABSTRACT

An airbag module including a first casing enclosing a first gas space, a first inflator and a control device for controlling ventilation of the first gas space or the shape of the first casing. The control device includes a second casing (42) enclosing a second gas space and a gas source. The second gas space is bordered by a permanent edge connection, and further includes a control element such as a strap (60), whose first end is connected to the first casing and whose second end is sewn to the second casing (42) by a tear seam (49), and is decoupled from the second casing (42) upon filling of the second gas space. The tear seam (49) touches or intersects the edge connection at two points so that the tear seam divides the second gas space into two regions (43a, 43b).

14 Claims, 9 Drawing Sheets

(51) Int. Cl.
    *B60R 21/2338*     (2011.01)
    *B60R 21/268*     (2011.01)

(52) U.S. Cl.
    CPC .... *B60R 21/268* (2013.01); *B60R 2021/2395* (2013.01); *B60R 2021/23384* (2013.01); *B60R 2021/2685* (2013.01)

(58) Field of Classification Search
    CPC .. B60R 2021/23332; B60R 2021/2685; B60R 2021/2395; B60R 2021/23384; B60R 21/268; B60R 2021/2338; B60R 21/2342
    See application file for complete search history.

(56) References Cited

U.S. PATENT DOCUMENTS

| | | | |
|---|---|---|---|
| 7,240,917 B2 | 7/2007 | Fogle, Jr. et al. | |
| 7,347,450 B2 | 3/2008 | Williams et al. | |
| 7,448,646 B2 | 11/2008 | Hall et al. | |
| 7,552,942 B2* | 6/2009 | Fischer | B60R 21/2338 |
| | | | 280/734 |
| 7,607,689 B2* | 10/2009 | Kalczynski | B60R 21/2338 |
| | | | 280/739 |
| 7,614,652 B2 | 11/2009 | Aoki et al. | |
| 7,614,653 B2 | 11/2009 | Rose et al. | |
| 7,614,654 B2 | 11/2009 | Williams | |
| 7,722,080 B2 | 5/2010 | Rose et al. | |
| 7,748,732 B2 | 7/2010 | Sella et al. | |
| 7,789,423 B2 | 9/2010 | Kim | |
| 7,845,678 B2* | 12/2010 | Pausch | B60R 21/2338 |
| | | | 280/735 |
| 7,922,200 B2* | 4/2011 | Webber | B60R 21/2338 |
| | | | 280/732 |
| 8,322,748 B2* | 12/2012 | Abe | B60R 21/2338 |
| | | | 280/730.2 |
| 8,388,021 B2* | 3/2013 | Mitsuo | B60R 21/205 |
| | | | 280/728.2 |
| 8,590,927 B2* | 11/2013 | Mendez | B60R 21/2338 |
| | | | 280/739 |
| 8,602,453 B1* | 12/2013 | Stevens | B60R 21/2338 |
| | | | 280/743.2 |
| 8,608,197 B2* | 12/2013 | Eckert | B60R 21/239 |
| | | | 280/728.2 |
| 8,777,260 B2* | 7/2014 | Kranzle | B60R 21/217 |
| | | | 280/739 |
| 8,789,849 B2* | 7/2014 | Puzzonia | B60R 21/233 |
| | | | 280/729 |
| 8,864,170 B2* | 10/2014 | Yamada | B60R 21/2338 |
| | | | 280/732 |
| 8,955,878 B2* | 2/2015 | Jang | B60R 21/239 |
| | | | 280/736 |
| 9,022,424 B2* | 5/2015 | Nakamura | B60R 21/2338 |
| | | | 280/739 |
| 9,340,177 B2* | 5/2016 | Hiruta | B60R 21/239 |
| 9,376,086 B2* | 6/2016 | Nebel | B60R 21/2338 |
| 9,403,503 B2* | 8/2016 | Buchholz | B60R 21/239 |
| 9,434,346 B2* | 9/2016 | Weber | B60R 21/239 |
| 9,676,360 B2* | 6/2017 | Weber | B60R 21/217 |
| 2004/0017069 A1* | 1/2004 | Fischer | B60R 21/233 |
| | | | 280/739 |
| 2004/0256845 A1 | 12/2004 | Damm | |
| 2006/0071461 A1 | 4/2006 | Williams et al. | |
| 2006/0290117 A1 | 12/2006 | Fischer et al. | |
| 2009/0091109 A1* | 4/2009 | Duarte De Arez | B60R 21/2338 |
| | | | 280/736 |
| 2009/0309341 A1 | 12/2009 | Pausch | |
| 2011/0148085 A1 | 6/2011 | Fukawatase et al. | |
| 2012/0292897 A1* | 11/2012 | Puzzonia | B60R 21/233 |
| | | | 280/741 |
| 2015/0115580 A1 | 4/2015 | Gould et al. | |
| 2015/0239424 A1* | 8/2015 | Nebel | B60R 21/2338 |
| | | | 280/729 |
| 2015/0314747 A1* | 11/2015 | Weber | B60R 21/239 |
| | | | 280/728.3 |
| 2016/0250990 A1* | 9/2016 | Weber | B60R 21/217 |
| | | | 280/728.2 |

FOREIGN PATENT DOCUMENTS

| | | |
|---|---|---|
| DE | 10 2008 028 389 A1 | 12/2009 |
| DE | 10 2008 039 675 A1 | 3/2010 |
| DE | 10 2009 055 266 A1 | 6/2011 |
| DE | 10 2010 039 895 A1 | 12/2011 |
| DE | 10 2011 015 309 A1 | 10/2012 |
| DE | 10 2011 117 940 A1 | 5/2013 |
| DE | 10 2012 016 460 A1 | 2/2014 |
| JP | 11-321506 | 11/1999 |
| WO | WO 2011/157631 A1 | 12/2011 |
| WO | WO 2012/130445 A1 | 10/2012 |
| WO | WO 2014/001317 A1 | 1/2014 |

\* cited by examiner

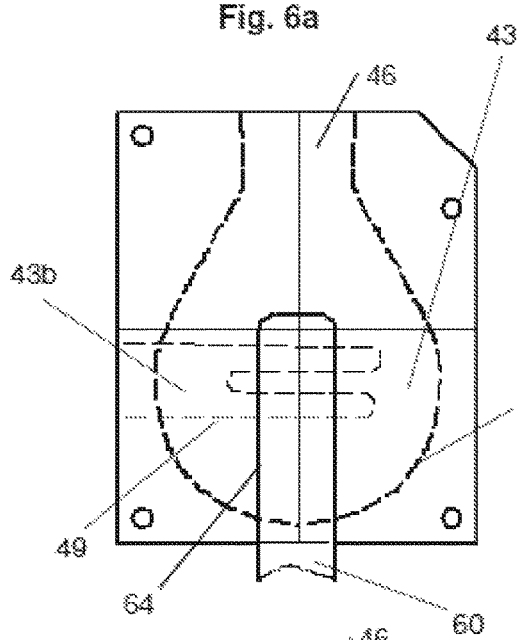
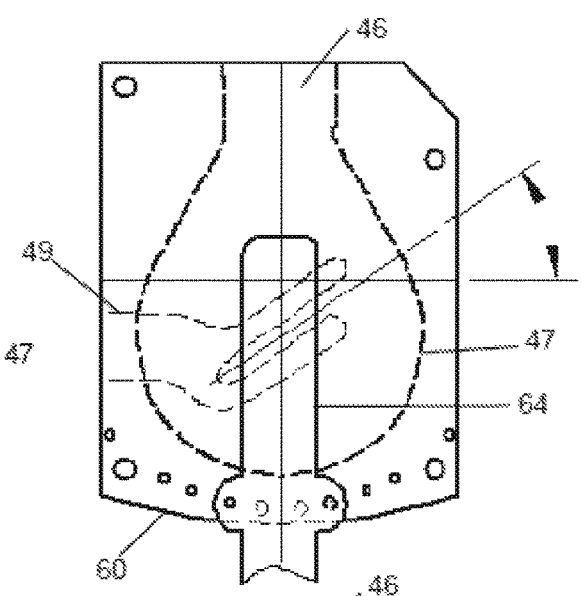
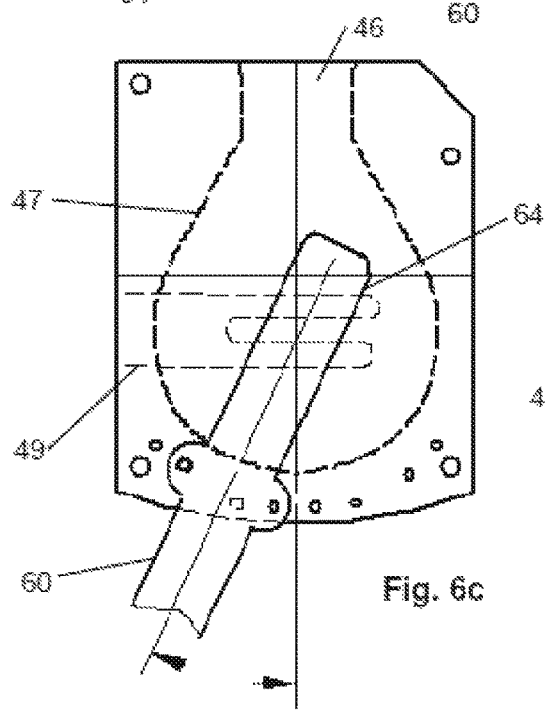
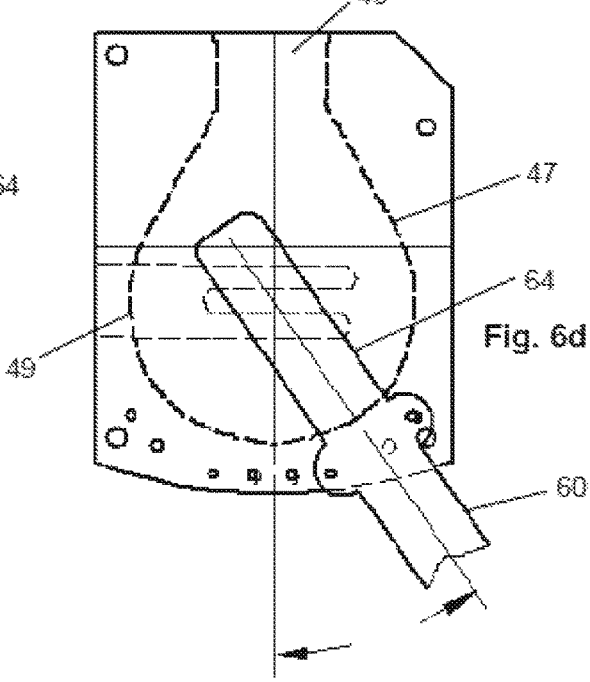

46

AIRBAG MODULE WITH A CONTROL DEVICE

CROSS REFERENCE TO RELATED APPLICATIONS

This application claims priority to German Patent Application No. 10 2014 000 185.7, filed on Jan. 14, 2014 and PCT/EP2015/050375, filed on Jan. 12, 2015.

FIELD OF THE INVENTION

The invention relates to an airbag module for a motor vehicle, including a control device.

BACKGROUND

Nearly every airbag, in particular every motor vehicle front impact airbag, includes a ventilation device through which inflation gas can escape from the airbag internal gas space—hereinafter called the first gas space—for restraint of the person to be protected. The first gas space is enclosed by the outer casing of the airbag, so that kinetic energy of the person to be protected is dissipated and the person to be protected does not simply rebound from the airbag casing of the airbag. In the simplest case such a ventilation device is simply a vent opening, in particular a vent opening in the airbag casing.

In order to take into account different accident situations and/or the weight of the person to be protected, control devices for influencing the shape of the airbag or the pressure in the gas space are known in the prior art. If the shape of the airbag is to be controlled, a releasable catch strap may be provided as a part of the control device. Furthermore, adaptive ventilation devices are known, which in addition to the vent opening include a throttle element, which in a first state throttles the gas flow through the vent opening more intensely than in a second state. Generally the first state is the throttled, or even fully closed state, and the second state is the less-throttled, for example, completely open state.

U.S. Pat. No. 6,648,371 B2 shows an example of an active control device wherein a pyrotechnically functioning actuator is described as part of the control device. Here the first end of a strap is connected to the throttle element and the second end of this strap to a bolt of the actuator. The actuator is thereby held, in particular, on the housing base of the airbag module. As long as the actuator is not actuated, the throttle element is thus connected to the housing base via the strap. In the event of a completely expanded airbag casing, the strap comes into a taut state, which holds the throttle element in its first state. If the actuator is actuated, then the bolts or fasteners that hold the second end of the strap are jettisoned by a pyrotechnic charge, the strap loses its tension, and the throttle element transitions into its second, namely its unthrottled (or less throttled) state. In principle this technology functions very well, but has the disadvantage that parts, such as, for example, the bolts, can fly about inside the gas space of the airbag casing, and that hot gases are created inside the airbag casing due to the pyrotechnic charge. Furthermore the pyrotechnic charge feeds additional gas into the gas space of the airbag casing, which is not always desired.

WO 2014/001317 A1 shows a similarly functioning actuator. Here an ignition capsule is surrounded by a hose. The end (usually upper end) of the hose facing away from the actuator is closed by a tear seam. This tear seam also holds the second end of a strap. If the ignition capsule is ignited due to an electrical signal, the tear seam tears, whereby the initially closed end of the hose opens and the second end of the strap is released. The advantage here is that no bolts or the like can fly about in the interior of the airbag. However, here the gas of the ignition capsule is also fed into the gas space of the airbag.

The generic device described by DE 10 2005 039 418 B4 proposes an airbag module including an adaptive ventilation device, wherein the control device includes a "small airbag module inside the airbag module" having a casing (second casing) and a gas source. Here the throttle element is influenceable by the second casing. The casing of this second airbag—designated hereinafter as the second casing—encloses a second gas space which can be filled by the gas source configured in particular as an ignition capsule. If this happens, then the second casing filled with gas withdraws the throttle element in the form of a cloth away from the vent opening so that the ventilation device transitions into its second, unthrottled state. It is advantageous here in particular that the gas generated by the ignition capsule remains in a second gas space. It is disadvantageous here that the second casing and vent opening must be directly adjacent to each other, which is often very difficult to realize. In particular it is scarcely possible to dispose the vent opening in the airbag casing in such a manner.

SUMMARY AND INTRODUCTORY DESCRIPTION

On this basis a feature of the present invention is to further develop an airbag of the above-described type such that great structural and functional flexibility. In the case that the ventilation is to be actively controlled, it should be possible in particular to provide the vent opening in one section of the airbag. This airbag casing can be the outer casing, which separates the first gas space from the environment, or a partition casing, which separates two chambers from each other. This casing is designated in summary form below as the "first casing."

This above described feature is achieved by an airbag module having the features described herein.

In addition to the second casing, the control device in accordance with the present invention includes a control element whose first end is at least indirectly permanently connected to the first casing, and whose second end is sewn to the second casing when the second gas space is not filled, and decoupled from the second casing when the second gas space is filled. In order that the tear seam can withstand high tensile forces when the second gas space is not filled and is nevertheless destroyed during filling of the second gas space (so that the second end of the control element releases from the second casing), it intersects or touches the edge connection at two points so that the tear seam divides the unfilled gas space into two regions divided by the tear seam.

As in the generic DE 10 2005 039 418 B4, the second casing remains closed so that no (or at least very little) gas of the gas source (second ignition capsule) reaches the second gas space. Nevertheless, due to the division of the second gas space by the tear seam, a very great opening force is generated, which has the advantage that when the second gas space is not filled, the tear seam can support very large forces and a ripping of the tear seam nevertheless occurs. Especially good results can be achieved here if the tear seam is configured as U-, omega-, W-, or V-shaped, in particular in the region where it is sewn to the control element, so that a large seam length results. However, other geometric designs of the tear seam, in particular a meander-shaped design, are also possible. Here it is generally to be preferred that the tear seam intersects the edge of the control element at exactly two points since the reproducibility is thereby improved.

In some embodiments of the present invention the control element is a strap; however it is also conceivable to sew a covering element of a ventilation opening, in particular in the form of a nozzle, directly to the second casing.

Due to the large forces that can be transmitted between the second casing and the control element when the second casing is not filled, both a use of active controlling of an adaptive ventilation device and an active controlling of the airbag depth (dual depths) are possible with the present invention.

The second casing described herein is advantageously manufactured from a one-piece blank, wherein the casing can also be configured as multi-layer sections to increase the volume and to increase the stability.

BRIEF DESCRIPTION OF THE DRAWINGS

Further preferred embodiments are indicated from the other dependant claims as well as from the exemplary embodiments depicted in more detail with reference to the Figures.

DETAILED DESCRIPTION

The invention is first described using an application example wherein ventilation of an airbag is controlled.

Figure 1:
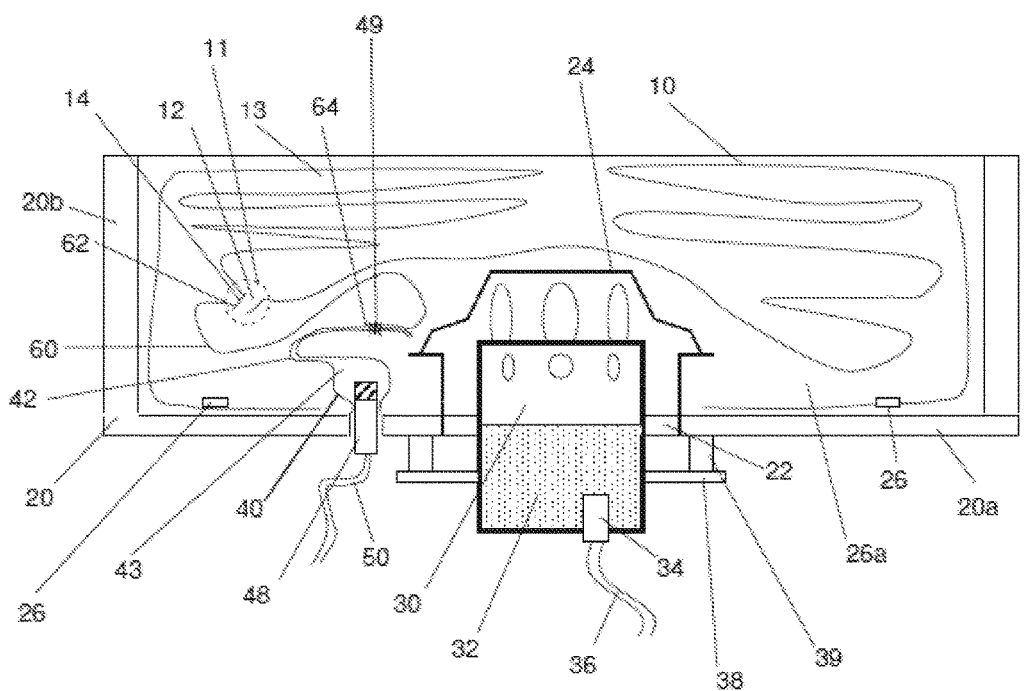
FIG. 1 shows an exemplary embodiment of an airbag module in accordance with the present invention in a schematized cross shows sectional depiction in the rest state, FIG. 2 the depiction in FIG. 1 after ignition of the gas generator and filling of the first gas chamber, which is enclosed by the airbag casing, referred to here as the first casing, wherein, however, the ventilation device is still in a throttled state.
Figure 2:
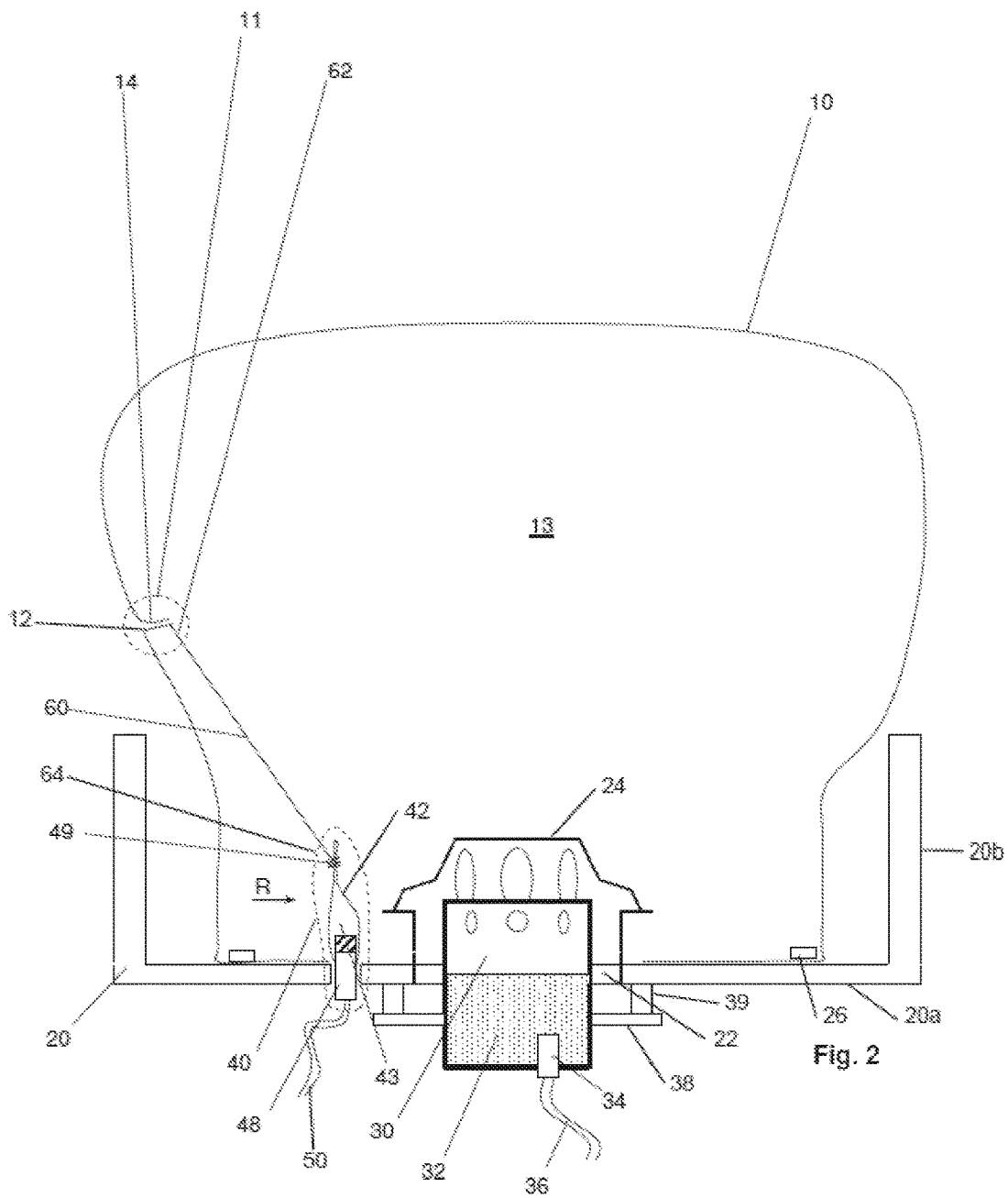
Figure 3:
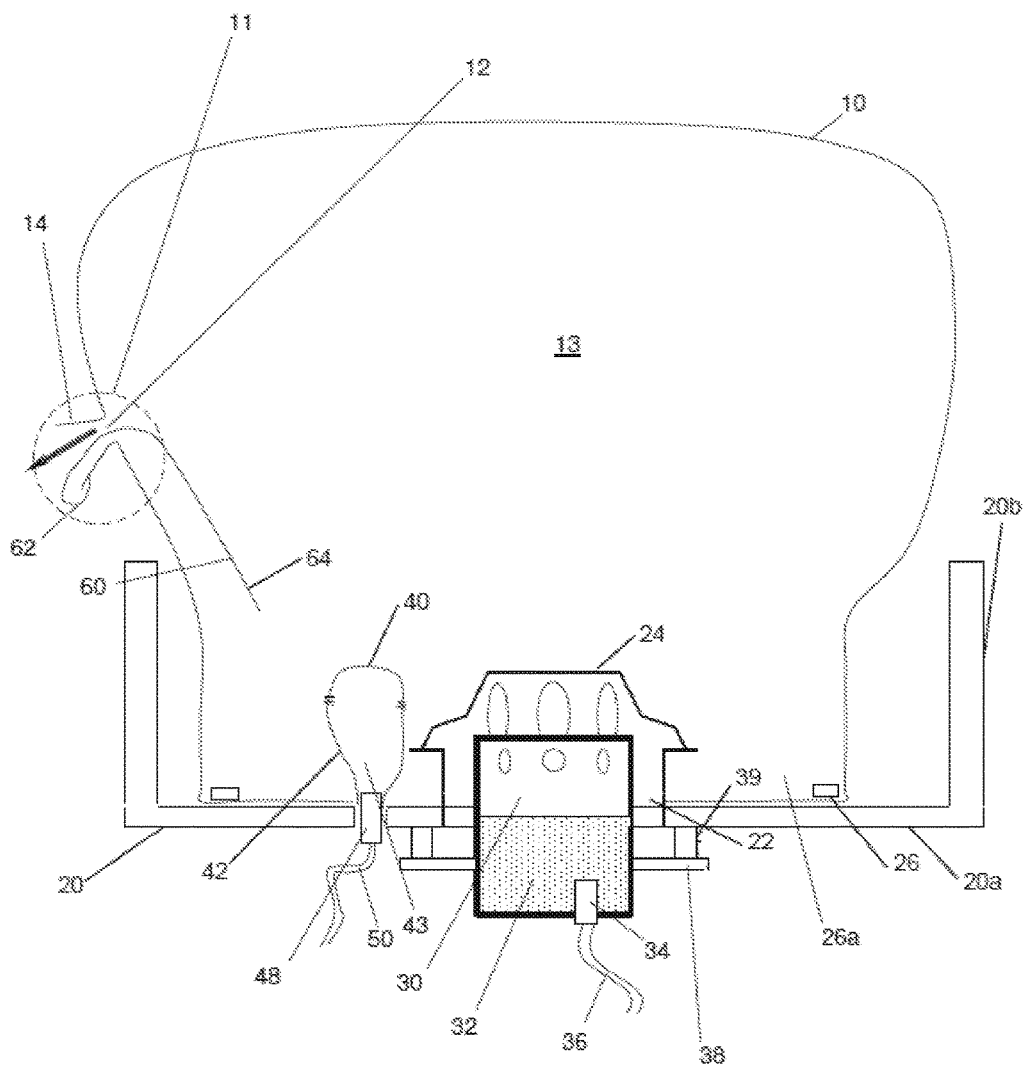
FIG. 3 shows the depiction in FIG. 2 after activation of an actuation unit, whereby the ventilation device is transitioned into an unthrottled state.

FIGS. 1 to 3 show a front airbag module, namely a driver airbag module for installation in the hub region of a steering wheel. It is basically constructed as in a common design and includes a housing 20 including a housing wall 20b and a housing base 20a, wherein the airbag casing designated here as first casing 10 is folded in the rest or normal non-deployed state. This first casing 10 encloses a first gas space 13. The first casing 10 is held on the housing base 20a by a retaining ring 26. A first inflator, namely a gas generator 30, serves to fill the first gas space, which gas generator 30 in the exemplary embodiment shown extends through an opening 22 in the housing base 20a into the interior of the housing 20 and thus into the first gas space 13. This gas generator 30 includes a propellant 32 in the usual manner, which is ignited by a first ignition capsule (initiator) 34 as soon as this is electrically activated via an ignition cable 36. In the upper region of the gas generator 30 there are escape openings for the generated gas; this region of the gas generator 30 is spanned by a diffusor 24. In the exemplary embodiment shown the connection between gas generator 30 and housing base 20a is effected via a flange 38 of the gas generator and damper 39.

On the first casing 10 an adaptive ventilation device 11 is provided, via which the first gas space 13 can be vented. A second ventilation device, in particular a non-adaptive ventilation device, in particular in the shape of a hole in the first casing can also be provided. However, this is not depicted. The adaptive ventilation device 11 includes a vent opening 12 and, in the exemplary embodiment shown, a cloth or patch, which surrounds the vent opening 12 and whose one end is fixedly connected to the first casing 10. This vent feature 14 forms the throttle element of the adaptive ventilation device 11. A strap element is provided in the form of a strap 60 whose first end 62 encircles the end of the vent feature 14 facing away from the first casing 10 such that the vent feature 14 is pulled together if the strap is under tension, so that in this state, the ventilation device is closed or at least throttled. If the first gas space 13 is filled with gas and if the strap 60 is not under tension, then the vent feature 14 is pushed outward by the pressure prevailing in the first gas space and the ventilation device transitions into its unthrottled (or less throttled) state. Such a ventilation device is described in detail, for example, in US 2006/0071461 A1, to which reference is made here, so that the exact structure of this ventilation device need not be described in more detail.

In an initial state, the second end 64 of the strap 60 is connected to an element of an actuation unit 40. In the event of an expanded first casing 10, the actuation unit 40 serves to transfer the ventilation device 11 (that is, the vent feature 14) from a first, namely throttled, into a second, namely an unthrottled, state. This actuation unit 40 is described as follows.

A second ignition capsule 48 is provided from which an ignition cable, namely the ignition cable 50, extends. The second ignition capsule 48 serves as the gas source of the actuation element 40. Furthermore, a second casing 42 is provided, which encloses a second gas space 43. This second gas space 43 is in fluidic connection with the gas source, which in the exemplary embodiment shown is achieved in that the second ignition capsule 48 is at least sectionally accommodated in the second gas space. However, it would also be possible, for example, to provide a gas-guiding element in the form of a tube. In any case the second casing 42 and the gas source 48 should form a gas-tight unit. The second casing 42 can be formed of normal airbag fabric. Thus in a known manner the actuation unit 40 forms a small airbag module inside the actual airbag module. The second end 64 of the strap 60 is sewn to the second casing 42 such that the seam, namely the tear seam 49, sews together two layers of the second casing 42. There are thus three layers in sections, namely the second end 64 of the strap 60, as well as two layers of the second casing 42. This is better depicted below with reference to FIG. 4. The structure of the second casing 42 and its connection to the strap 60 is discussed again below with reference to FIG. 4.

If the gas generator 30 is now ignited, then gas flows into the first gas space 13 and the first casing 10 expands in the usual manner. The strap 60 thereby tenses, whereby the vent feature 14 is pulled together and very little or no gas can escape through the vent opening 12 so that the ventilation device is in a first, throttled state (FIG. 2).

If the second ignition capsule 48 is now ignited, then the gas generated by it fills the second gas space 43, whereby the second casing 42 expands but remains closed. Due to this expansion, the tear seam 49 is torn and thus the second end 64 of the strap 60 is separated from the second casing 42. The strap 60 can thus no longer support tension forces and the vent feature 14 is pushed outward by the inflation gas pressure prevailing in the first gas space, whereby the vent opening 12 is released and the ventilation device and thus also the vent feature 14 transitions into a second, namely unthrottled (or less throttled) state. As already mentioned, the second casing 42 remains closed so that the second ignition capsule 48 and the gas generated by it cannot interact with other elements of the airbag module (FIG. 3).

Figure 4:
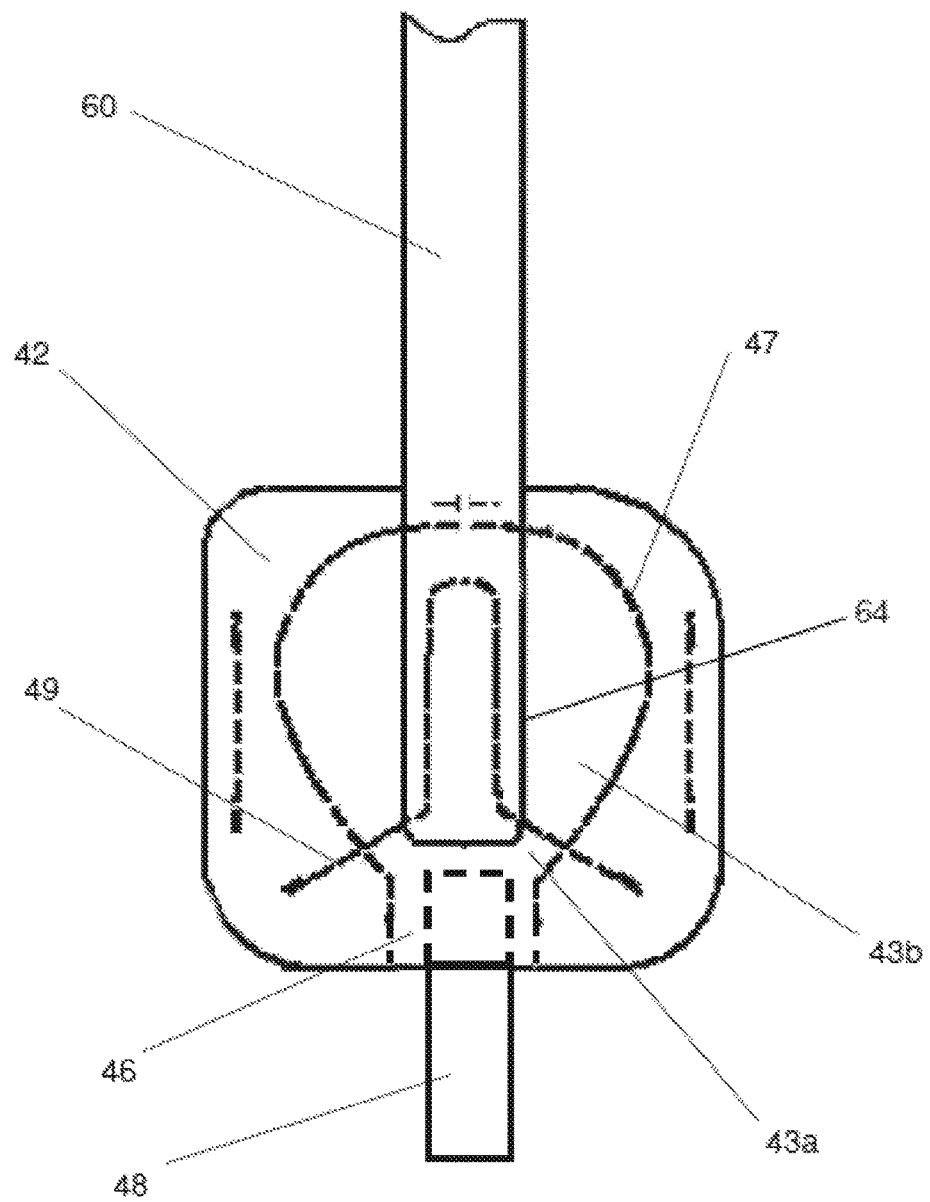
FIG. 4 shows the actuation unit from FIG. 2 in a plan view from direction R.

FIG. 4 shows the specific design of the second casing 42 and the connection between second casing 42 and strap 60. In this exemplary embodiment, the strap 60 forms the control element. In the exemplary embodiment shown, the second casing is configured as two-layer; a sectional structure made from a plurality of layers is also possible as shall be seen later with reference to FIGS. 8a and 8b. The present description applies generally, however for the sake of simplicity of vent feature description, two layers shall be discussed in the following. The two layers are sewn to each other by a permanent seam 47. Instead of a permanent seam 47, another permanent connection could be provided, for example an adhesive connection or a welded connection. The permanent seam 47 extends essentially pear- or omega-shaped around the second gas space 43 such that there is a relatively narrow opening 46 through which either the second ignition capsule 48, a supply tube, or the ignition cable 50 of the second ignition capsule enters from outside into the second gas space 43. The first alternative to that just described is depicted; here the second ignition capsule 48 passes through the opening 46 into the interior of the second casing. In the use state the pass-through opening should be closed as tightly as possible, which can be effected by a clamp, by adhering or other suitable measures. Starting from the opening 46 the second gas space 43 widens out in a pear-shaped manner.

The strap 60 is sewn to the second casing 42 by the tear seam 49, wherein the tear seam 49 extends through the second gas space 43 and divides it into a first region 43a and a second region 43b. In order to achieve this separation, the second tear seam 49 intersects the permanent seam 47 (or a corresponding other permanent connection) at two points, wherein it would also be sufficient that the tear seam starts at these two points. However, a real intersecting is to be preferred for mechanical reasons. In the region wherein the strap 60 is sewn to the second casing 42, the tear seam 49 is configured essentially U-shaped, wherein the two arms of the U extend essentially parallel to the longitudinal extension of the strap 60. Instead of a U-shape, a V- or omega-shape is also suitable in particular. With a very wide control element, a W-shape (this could also be called an M-shape) can also be advantageous.

The first region 43a of the second gas space 43 is the region adjacent to the opening 46, which region is initially filled with gas in the event of the activating of the gas source (here the second ignition capsule 48). Due to the relatively small volume of the first region 43a of the second gas space, in the event of ignition of the second ignition capsule 48 (or another supplying of gas) a large force is exerted on the tear seam 49 and in particular on the region of the tear seam 49 that connects the strap 60 to the second casing 42, so that the tear seam is certainly torn at least in this region and the strap 60 is separated from the second casing 42. This is supported in particular in that the region of the tear seam 49 that connects the strap 60 to the second casing 42 is disposed relatively centrally with respect to the second gas space 43. The pear shape of the second gas space 43 also contributes to a certain tearing of the tear seam with certain maintenance of the gas-tightness of the second casing. After destruction of the tear seam 49 the second region 43b also fills with gas, and the first region 43a and second region 43b unite into a common, closed gas space.

Figure 5:
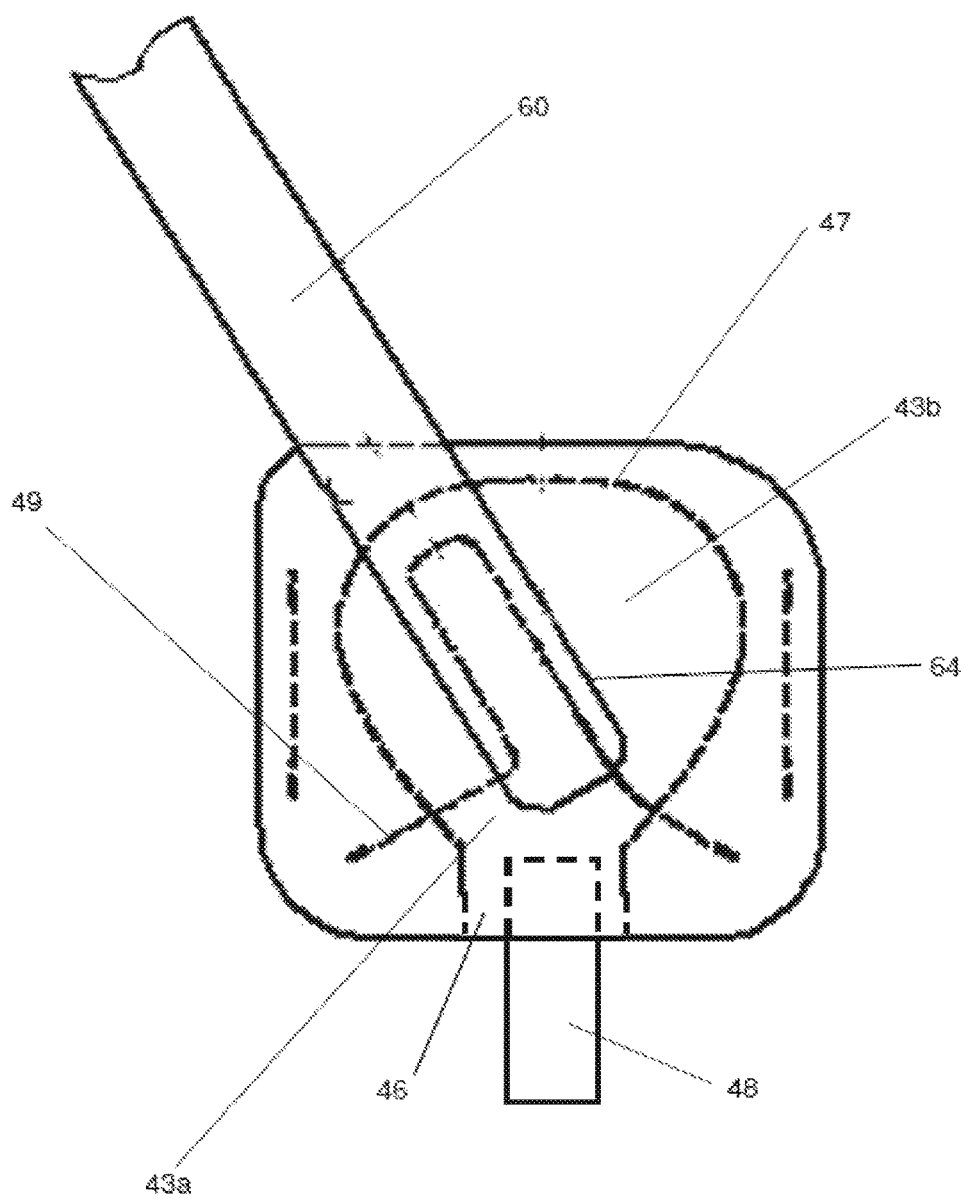
FIG. 5 shows an alternative design of the actuation unit from FIG. 4 in a depiction corresponding to FIG. 4, FIG. 6a-d show alternative designs of the connection between strap and second casing.

FIG. 5 shows a variant to that shown in FIG. 4; here the strap 60 is asymmetrically disposed, wherein the section of the tear seam 49 that connects the strap 60 to the second casing 42 is also configured U-shaped with two arms parallel to the longitudinal extension of the strap 60. The "asymmetry angle" (angle measured between the longitudinal axis of strap 60 and the axis of symmetry of second gas space 43) can in principle be any, in particular between 0° and 90° (similar angles are illustrated in FIGS. 6c and 6d).

FIGS. 6a to 6d show alternative embodiments of the tear seam 49, which here extends essentially meander-shaped. A relatively large seam length also arises here, wherein, however, the first region 43a of the gas space 43 is larger than the second region. After tearing of the tear seam 49, the first region 43a and second region 43b also unite here to a common, closed gas space. The stitching of tear seam 49 can be provided at an angle to a line perpendicular to the longitudinal axis of second gas space 43, as illustrated in FIG. 6b. The angle drawn in here can also in principle be chosen as desired between 0° and 90°.

However, according to the current state of knowledge the embodiment shown in FIGS. 4 and 5 (including their variants) is a preferred one, which is justified as follows: on the one hand there is a very favorable ratio between the volume of the first and the second region for the second gas space 43. Furthermore, the following is significant: in the embodiment of FIGS. 4 and 5 (this would also apply to variants wherein the section of the tear seam 49 that connects the control element to the second casing is omega-, V-, W-, M-, or even N-shaped) the tear seam 49 intersects the edge of the control element at only two points. With these two points it cannot be precisely defined whether the stitch in question of the tear seam 49 still holds the control element, and if so, by what percentage. In order to keep the reproducibility high it is also favorable to provide only two such transition points (fewer is not available, since otherwise it would not be possible to divide the second gas space 43 into two sections). Furthermore, the reproducibility is all the greater the more stitches of the tear seam 49 definitely lie inside the control element, thus the longer the section of the tear seam 49 that connects the control element to the second casing 42. Best is the combination of both, namely to provide only two transition points and to design the section of the tear seam 49, which connects the control element to the second casing 42, U-, W-, V-, or omega-shaped as described above so that the ratio between the number of defined connection stitches and that of the not precisely defined connection stitches is high.

Figure 7A:
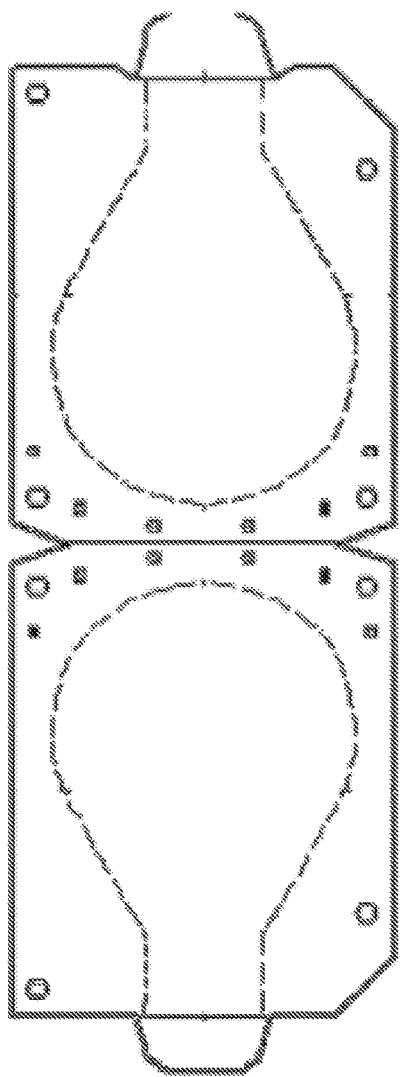
FIG. 7a shows a blank for manufacturing a two-layer second casing.
Figure 7B:
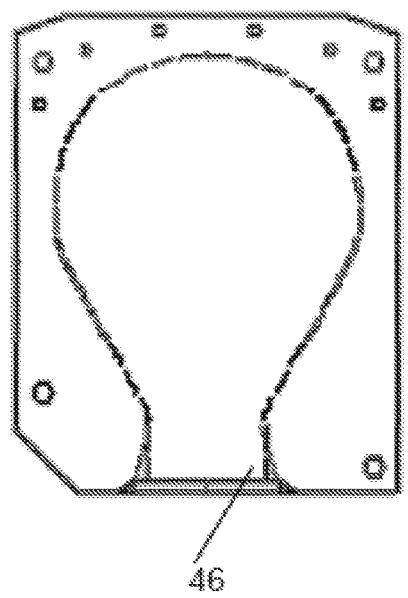
FIG. 7b shows the second casing manufactured from the blank shown in FIG. 7a, FIG. 8a shows a blank for manufacturing a four-layer second casing.

As has already been mentioned, it is preferred to manufacture the second casing 42 from a one-piece blank. An example of such a one-piece blank is shown in FIG. 7a. It is easily recognized that the second casing 42 can be obtained by simple folding of this blank and subsequent sewing together, welding together or adhering together providing the configuration illustrated by FIG. 7b.

Figure 8A:
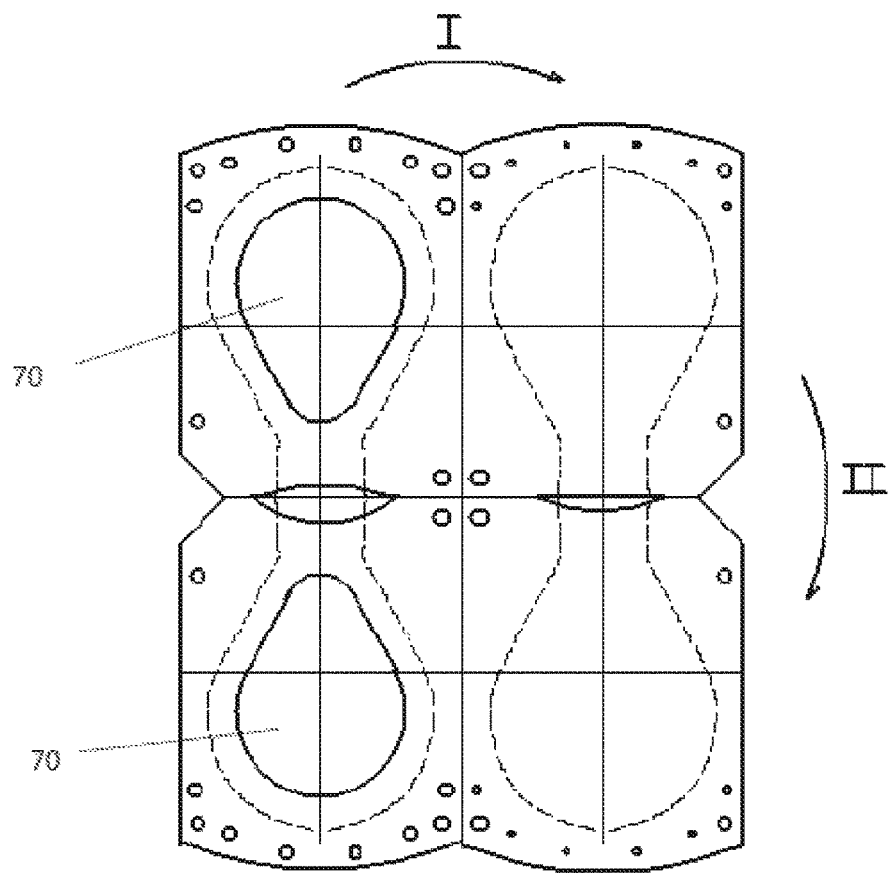
FIG. 8b shows the second casing manufactured from the blank shown in FIG. 8a, and FIG. 9 shows a second application of an inventive actuation unit in a depiction corresponding to FIG. 2.
Figure 8B:
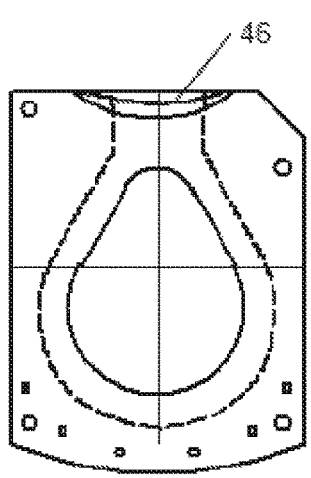

In order to generate a somewhat larger volume and a strengthened edge region, the second casing 42 can also be folded from a somewhat more complex blank, as is shown in FIG. 8a, wherein the depicted left half of the blank forms two additional inner layers in the edge region; i.e., that the blank here includes two breaks or voids 70 that follow the shape of the second gas space 43. Due to such a strengthened edge region the gas-tightness of the second gas space can also be improved, i.e., the leakage can be reduced. When folded twice as shown in FIG. 8a, first about the direction designated as I and second about the direction designated by II, the completed condition results as illustrated in FIG. 8b.

In the exemplary embodiments described up to now, wherein the ventilation of the airbag is actively controlled, it would also be possible to omit the strap 60 and to sew the cloth directly to the second casing 42. In this case the vent feature 14 would have a dual function, namely as part of the ventilation device and as control element.

Figure 9:
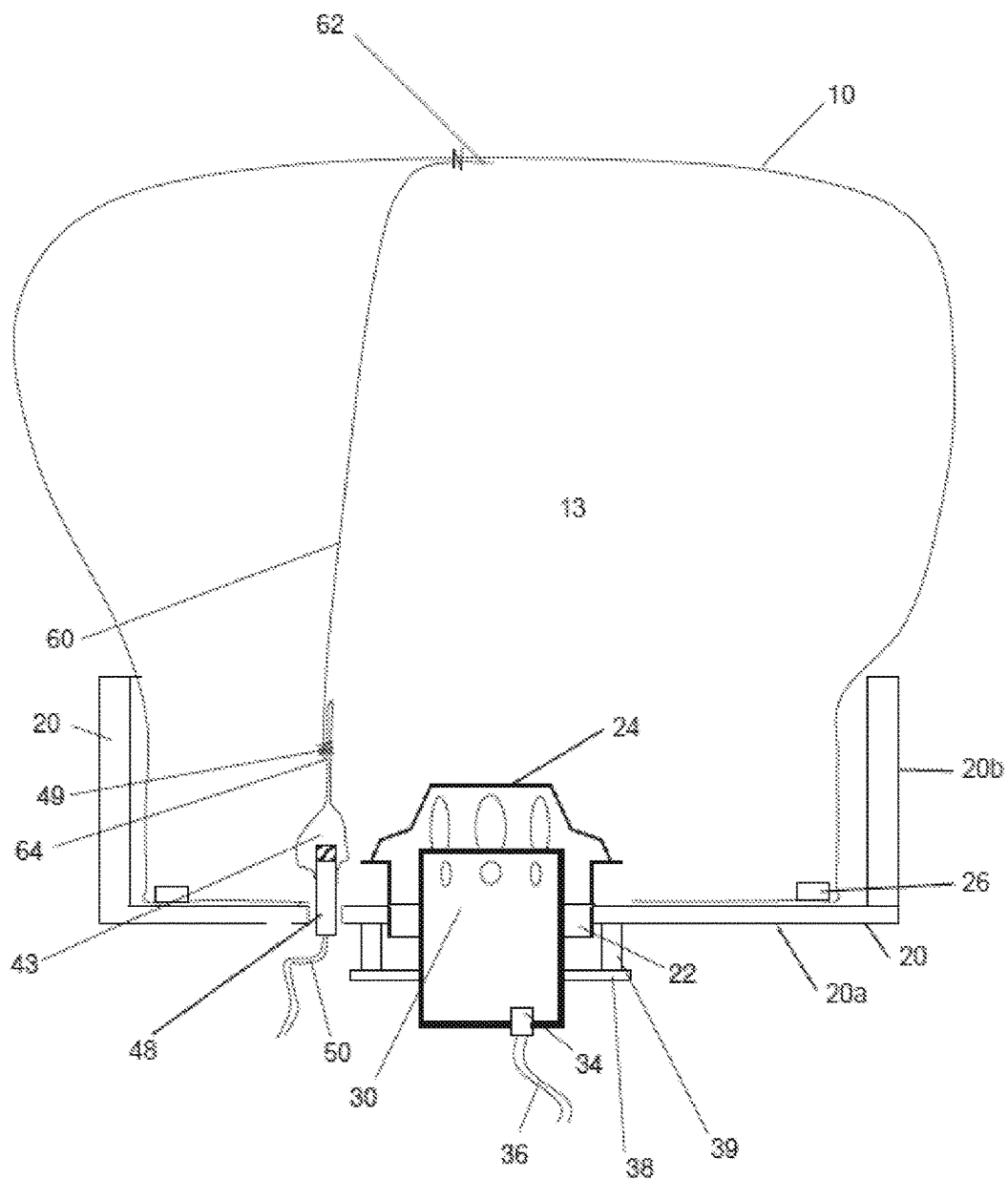

Up to now the invention has been described using an application where the actuation unit 40 influences the state of an adaptive ventilation device. This is one application, but other applications are also possible, in particular the influencing of the shape, in particular the depth, of the first casing. This is shown in FIG. 9. Here the first end 62 of the strap 60, serving in this case as an edge band, is directly connected permanently to the first casing 10, in particular sewn. Prior to the ignition of the second ignition capsule 48 (i.e., prior to the activation of the actuation unit 40) a reduced maximum expansion of the first casing thus occurs (FIG. 9), after the ignition of the second ignition capsule 48, the full maximum expansion of the first casing 10 (not shown) ("dual depth"). All previously described embodiments of the actuation unit 40 can also be used for this application.

While the above description constitutes the preferred embodiment of the present invention, it will be appreciated that the invention is susceptible to modification, variation and change without departing from the proper scope and fair meaning of the accompanying claims.

The invention claimed is:

1. An airbag module including comprising,
a first casing enclosing a first gas space,
a first inflator for filling the first gas space and
at least one control device for active controlling of the ventilation of the first gas space or the shape of the first casing, wherein the at least one control device includes a second casing enclosing a second gas space and a gas source for filling the second gas space, wherein the second gas space is bordered by a permanent edge connection, and wherein
a state of the at least one control device changes due to filling of the second gas space by the gas source,
the at least one control device further includes a control element whose first end is connected to the first casing and whose second end is sewn to the second casing by a tear seam and coupled with the second casing when the second gas space is not filled by the gas source, and is decoupled from the second casing in the event that the second gas space is filled by the gas source, wherein the tear seam touches or intersects the edge connection at two points so that the tear seam divides the unfilled second gas space into two regions separated by the tear seam.

2. An airbag module according to claim 1, further comprising in that the section of the tear seam that connects the control element to the second casing is shaped in one of a U-, V-, W-, or omega shape.

3. An airbag module according to claim 1, further comprising in that the tear seam is configured meander-shaped.

4. An airbag module according to claim 1 further comprising in that the second gas space is configured pear-shaped.

5. An airbag module according to claim 1 further comprising in that the second casing is formed from a one-piece blank which is folded to form the second gas space.

6. An airbag module according to claim 5 further comprising the one-piece blank is folded to form the second gas space.

7. An airbag module according to claim 5, further comprising in that the second casing is configured at least three-layer in an edge region at least partially surrounding the second gas space.

8. An airbag module according to claim 7 further comprising the second gas space is formed by a one-piece blank, the one-piece blank forming a region with at least one void or hole, the one-piece blank being folded twice to form the second gas space.

9. An airbag module according to claim 1 further comprising in that the second casing forms a gas-tight unit at least together with the gas source.

10. An airbag module according to claim 1 further comprising in that the tear seam intersects the edge of the control element at exactly two points.

11. An airbag module according to claim 1 further comprising the control element is in the form of a strap.

12. An airbag module according to claim 11 further comprising the strap first end is stitched to the at least one control device.

13. An airbag module according to claim 11 further comprising the strap forming a first longitudinal axis and the second gas space forming a second longitudinal axis, wherein the first and the second longitudinal axes are parallel or coincident.

14. An airbag module according to claim 11 further comprising the strap forming a first longitudinal axis and the second gas space forming a second longitudinal axis, wherein the first and the second longitudinal axes form an angle between 0° and 90°.

* * * * *